June 13, 1961  H. P. THACKER, JR  2,988,305
LAUNCHING DEVICE FOR AIRCRAFT
Filed March 5, 1957  3 Sheets-Sheet 1

INVENTOR.
HUGH P. THACKER, JR.
BY
Jerome R. Cox
ATTORNEY

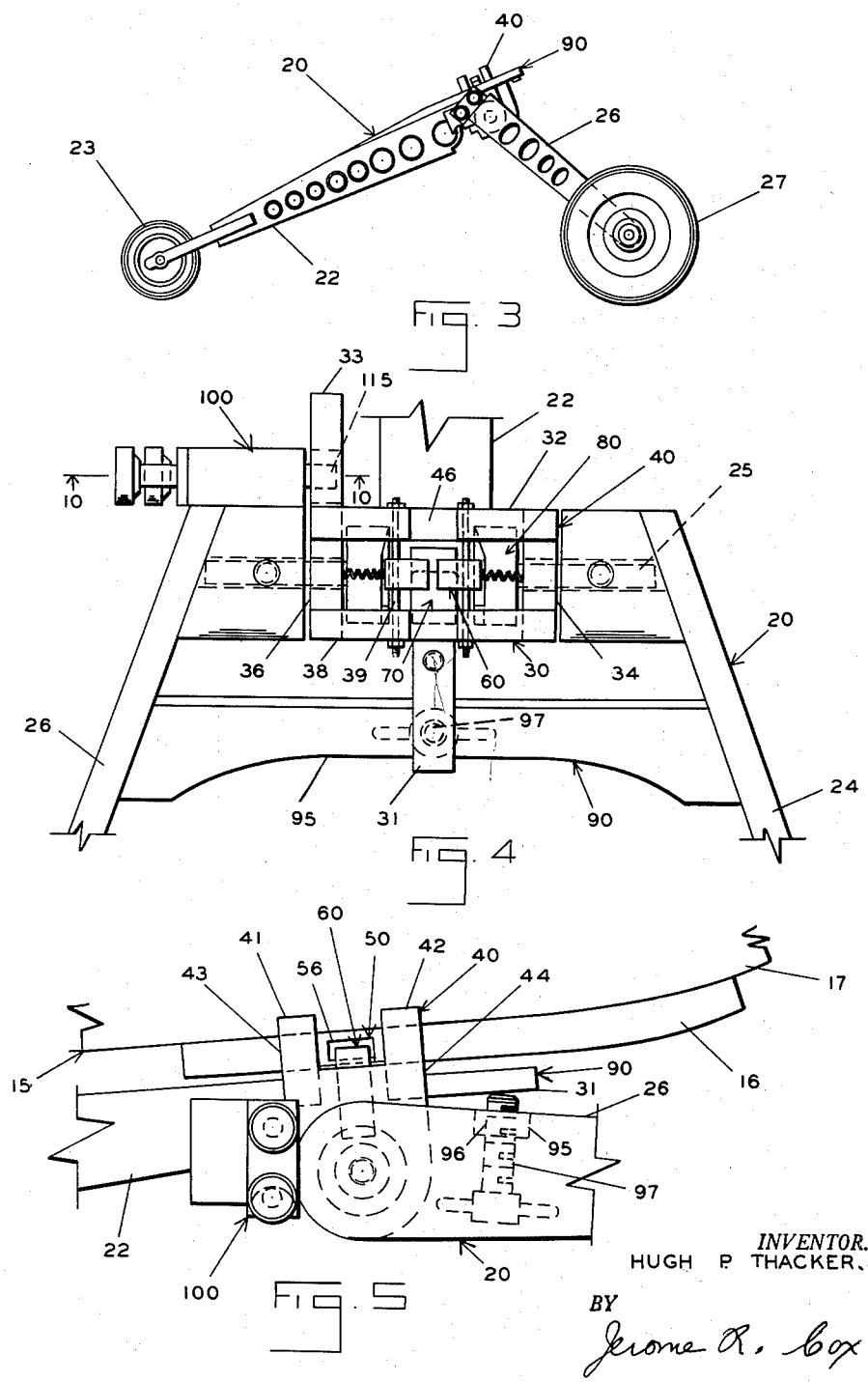

June 13, 1961    H. P. THACKER, JR    2,988,305
LAUNCHING DEVICE FOR AIRCRAFT
Filed March 5, 1957    3 Sheets-Sheet 3
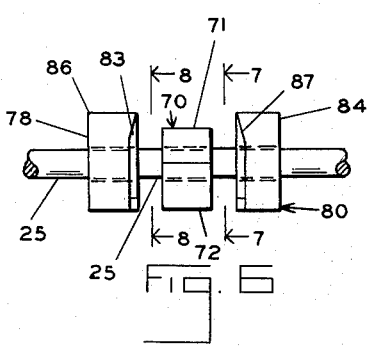
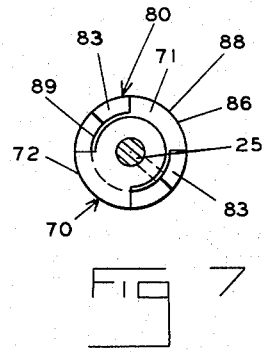
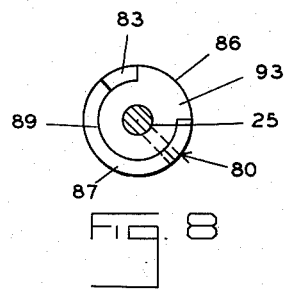
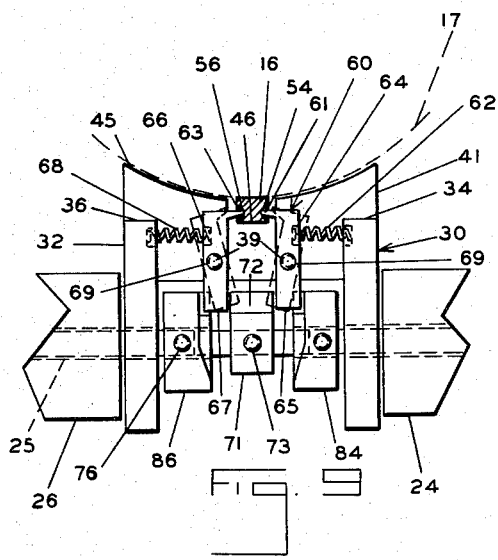
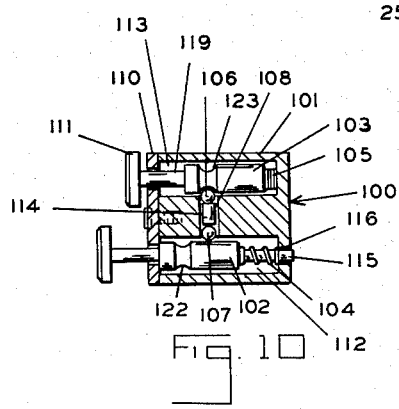
INVENTOR.
HUGH P. THACKER, JR.
BY
Jerome R. Cox
ATTORNEY United States Patent Office 2,988,305
Patented June 13, 1961

2,988,305
LAUNCHING DEVICE FOR AIRCRAFT
Hugh P. Thacker, Jr., Darby Crest Addition, Ohio, assignor to Jerome R. Cox, as trustee for Hugh P. Thacker, Jr., Maurice R. Doty, and Hyman H. Weinberg
Filed Mar. 5, 1957, Ser. No. 644,052
6 Claims. (Cl. 244—63)

I. *General definition of the inventions*

The inventions disclosed and/or illustrated in this application relate in part to automatically detachable launching dollies for aircraft, to means for automatically detaching such dollies from an aircraft as soon as the aircraft becomes airborne, and to means for at times removably securing such dollies to aircraft as for example when such aircraft is lifted by independent mechanical means from a supporting surface.

Certain aircraft do not require permanently attached, wheeled landing gear for landing purposes. For example, remotely controlled model aircraft, pilotless aircraft and guided missiles are landed most effectively without using conventional landing gear since precision landings are difficult to control effectively by remote means. Flying boats and seaplanes, equipped to land only on water, do not require permanently attached wheeled landing gear for landing purposes.

When it is desirable to launch such aircraft from a land base, from a flight deck, or from any other firm supporting surface, they must be provided with a wheeled undercarriage capable of supporting the aircraft until it becomes airborne. If such an undercarriage is permanently secured to such aircraft, it constitutes a useless element of drag which serves only to reduce the efficiency of the aircraft after it has become airborne.

An auxiliary launching dolly which is subject to automatic instantaneous release from an aircraft as soon as the aircraft becomes airborne can be employed to advantage in launching aircraft equipped with retracted conventional landing gear, since such launching dolly, together with its attendant drag factor can be released from the aircraft more rapidly than conventional landing gear can be retracted. The release of such a device at the most advantageous time is assured by automatic mechanical means and therefore the dependability of its operation is not subject to pilot error.

Launching devices which employ detachable undercarriages for aircraft have heretofore been developed. All such devices known to the applicant are released from the aircraft either (1) by a human agency such as the pilot or a ground control operator; (2) automatically after a takeoff run of a predetermined length; or (3) automatically upon reaching a predetermined airspeed as indicated by a Pitot tube or airspeed indicator. No such device known to me has heretofore rendered an aircraft and its launching undercarriage automatically disengageable in direct response to the actual lift exerted by the aircraft itself.

Since the indicated airspeed factor is only one of several variable factors which must be considered in determining the anticipated behavior of an aircraft when it is released from a launching apparatus, a distinct advantage is provided in such a device which is releasable only in response to the lift force which is actually exerted upon the aircraft at the moment such aircraft becomes airborne under its own power.

A further advantage is provided in a launching device which remains firmly attached to aircraft until the moment it become airborne, in that the release of the launching undercarriage at that point in the takeoff procedure assures that additional lift will be available to the aircraft at the most critical point in a launching operation.

Another invention illustrated in this application relates to a novel mechanical latching device which is adapted to positively secure a cooperating body under extremely vibratory conditions; which is responsive to a radially directed thrust force, exerted by or upon such body, to positively release said body; and which is not subject to failure under normal icing conditions.

A further invention illustrated in this application relates to a novel locking device.

II. *Objects of the invention*

One of the objects of my invention is to provide a mobile supporting structure for an aircraft not airborne which is adapted to be automatically detached from the aircraft as soon as such aircraft becomes airborne.

A further object of my invention is to provide a combination of an aircraft and a securely attached undercarriage which may be automatically detached from the aircraft when it becomes airborne so as to reduce the drag force operating upon the aircraft in flight.

A still further object of my invention is to provide an automatically releasable aircraft undercarriage which may be fixedly secured to an aircraft by pushbutton means.

A still further object of my invention is to provide a novel locking means for securing one movable element to an associated movable element so as to prevent independent movement of either element.

A still further object of my invention is to provide a novel latching device capable of positively securing a detachable element to an aircraft under extreme vibratory conditions and of positively releasing such element by cam means.

A still further object of my invention is to provide a locking device capable of snap action which is not subject to failure under extreme vibratory conditions of operation.

A still further object of my invention is to provide a latching device which is not subject to failure under icing conditions and which is adaptable for use as a safety device wherein the repositioning of an element secured thereto functions to automatically release said device.

III. *The drawings*

In the drawings which disclose a preferred embodiment of my invention:

FIG. 3 is a view in side elevation of the launching dolly of FIG. 2 shown in the retracted or aircraft releasing position which the dolly assumes in response to a lifting force sufficient to render an attached aircraft airborne;

FIG. 4 is a top plan view of the launching dolly in the extended (normal aircraft holding) position showing cooperating components of latching, releasing, locking and attitude adjusting elements, with no aircraft attached and with outwardly extending legs broken away;

FIG. 5 is a view in side elevation of a fragment of the structure of FIG. 4 showing also a fragment of an aircraft at rest and secured upon the dolly, parts of both the aircraft and dolly being broken away;

FIG. 6 is a plan view of a detail of the device of FIG. 4 showing the camshaft assembly only;

FIG. 7 is a view in section of the camshaft taken along line 7—7 of FIG. 6;

FIG. 8 is a view in section of the camshaft taken along line 8—8 of FIG. 6;

FIG. 9 is a fragmentary front elevational view of the latching cradle of FIG. 4 with the forward wall removed to show cooperating cams and pawls; and FIG. 10 is a sectional view of the lock assembly only taken along line 10—10 of FIG. 4, showing pistons, balls and ball spacer in place and showing the complete assembly in the unlocked position.

IV. Detailed description

Figure 1:
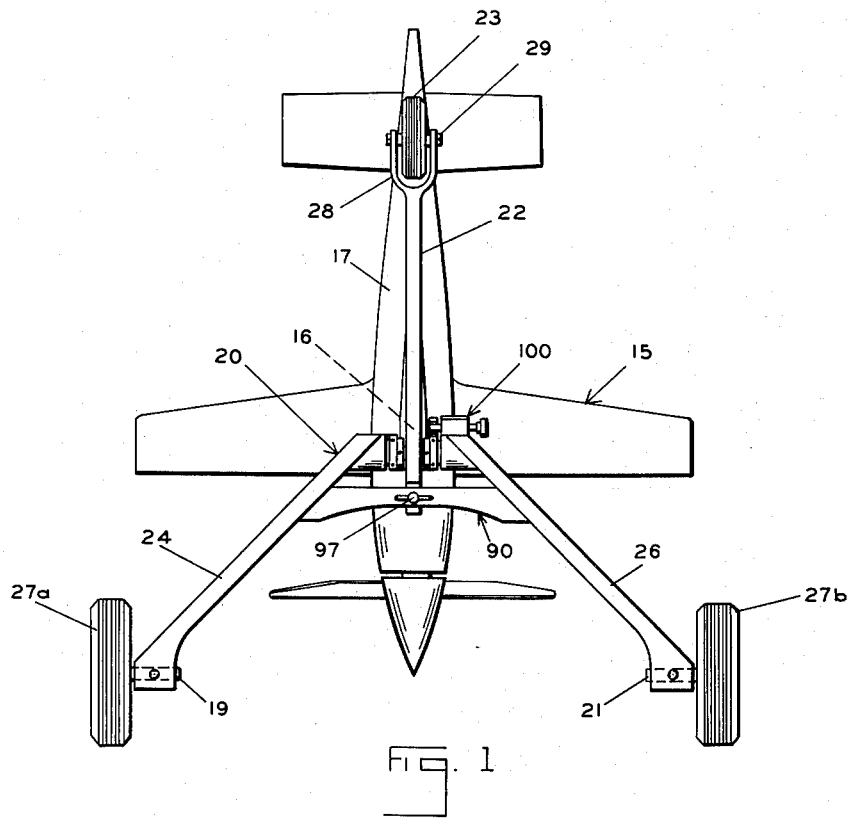
FIG. 1 is a bottom plan view of an aircraft at rest having attached to it a launching dolly constructed according to the present invention.

Referring to the drawings for a detailed description of an embodiment of my invention it may be seen that I have shown generally in FIG. 1 an aircraft 15 without fixed landing gear and having a keel rail 16 secured to the underside of its fuselage 17 as hereinafter described in more detail. Associated with aircraft 15 I have shown generally in FIG. 1 the preferred embodiment of my improved aircraft launching dolly 20 secured to and supporting the aircraft 15 when the aircraft is not airborne.

Figure 2:
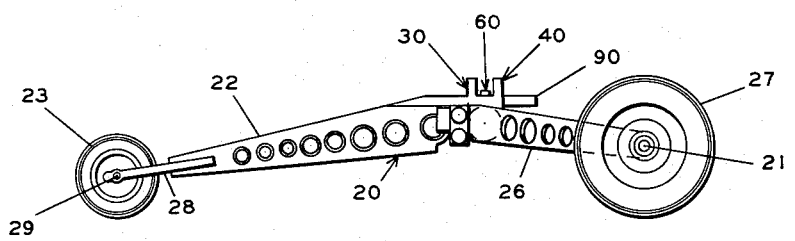
FIG. 2 is a view in side elevation of a launching dolly, constructed according to the present invention, showing the dolly in the normally extended attitude which it assumes when holding an aircraft which is exerting no effective lift.

The preferred embodiment of dolly 20 as shown in detail in FIGS. 1 and 2 consists of a wheeled tripod which has a rigid frame 30, a trailing leg 22 rigidly secured to the frame 30 and extending rearwardly therefrom, and two forwardly extending legs 24 and 26 secured to opposite ends of a camshaft 25 (as shown in FIG. 4), said camshaft being journalled within opposite walls 34 and 36 of frame 30 and rotatable about a transverse horizontal axis thereof.

Trailing leg 22 is formed with a rearwardly extending yoke portion 28 (FIG. 1) having a transverse axle 29 secured thereto by suitable means. A wheel 23 is journalled on axle 29 so as to be freely rotatable thereon. Forwardly extending legs 24 and 26 are formed with axles 19 and 21 secured to their outer ends so as to extend angularly from said legs and to be in mutual axial alignment along a transverse axis of dolly 20 parallel to axle 29. Wheel 27a is secured by suitable means upon axle 19 of leg 24 so as to be freely rotatable thereon about said axle. A similar wheel 27b is similarly secured upon axle 21 and is free to rotate thereon.

I have further provided, as indicated generally in FIG. 5 and described below in more detail, means 40 for cradling and aligning fuselage 17 of the aircraft 15 upon dolly 20; means 50 attached to fuselage 17 of the aircraft 15 for at times engaging the latch of dolly 20; latch means 60 for releasably securing aircraft 15 to dolly 20; means 70 (shown best in FIG. 4) for at times holding said latch means 60 in positive engagement with said latch engaging means 50; means 80 for at times automatically releasing latch means 60; means 90 for adjusting the attitude of aircraft 15 during a launching operation; and lock means 100 for at times rendering inoperable said automatic releasing means 80.

V. Means for aligning the aircraft upon the dolly

I provide means 40 shown in FIG. 5 for cradling fuselage 17 of aircraft 15 upon a dolly 20 so as to maintain the longitudinal axis of the aircraft parallel with the separate planes of rotation of dolly wheels 23, 27a and 27b. Such means comprises upwardly extending cradle portions 41 and 42 formed integrally with rear frame wall 32 and forward frame wall 38 respectively, both said cradle portions having upwardly facing, substantially concave faces 45 coaxially aligned along an axis in the plane of rotation of trailing wheel 23; two transverse channels 46, centrally disposed within concave faces 45 of cradle portions 41 and 42, both such channels being in coaxial alignment along an axis parallel with the common axis of the two concavities 45; and a metallic keel rail 16 longitudinally disposed exteriorly along the underside of fuselage 17 so as to intersect at its midpoint the vertical normal axis of aircraft 15 and to extend forwardly and rearwardly from said normal axis sufficiently far to be simultaneously engaged within both channels 46, said rail 16 being rigidly secured by appropriate means to suitable structural frame members of fuselage 17.

VI. Means for engaging the latch of the launching dolly

I also provide, on aircraft 15, means 50 shown in FIG. 5 for engaging latch means 60 of dolly 20 (described hereafter in more detail). Said latch engaging means 50 comprises two channel recesses 54 (not shown) and 56 which are oppositely disposed and extend longitudinally along the opposite lateral faces of keel rail 16, said recesses 54 and 56 being of suitable size and configuration to provide a snug sliding fit for jaws 61 and 63 of latch means 60, said jaws 61 and 63 being later described in detail and said recesses being oppositely disposed in keel rail 16 so as to be mutually centered on the lateral perpendicular axis of rail 16 which passes through the midpoint of said rail.

VII. Means for latching the dolly to the aircraft

I also provide, in dolly 20, latch means 60 shown in FIG. 9 for cooperating with said latch engaging means 50 to releasably secure the fuselage 17 of aircraft 15 within cradling means 40 when the aircraft is not airborne. Said latch means 60 comprises pawls 64 and 66, two pawl pivot axles 39, and pawl engaging springs 62 and 68, each of said means being described hereafter in more detail.

Pawls 64 and 66 are formed of suitable metallic material to similar configurations, each being substantially rectangular in both longitudinal and vertical cross sections; and each of said pawls having similar jaw portions similarly disposed, as for example, portion 63 of pawl 66. Jaw portion 63 is substantially triangular in vertical cross section and rectangular in horizontal cross section and is disposed transversely of one lateral face of rectangular pawl 66 so as to lie adjacent one end thereof with an apex of said triangular portion 63 projecting laterally from said face and extending across said face parallel with said adjacent end of pawl 66. Said pawl 66 is further provided with a transverse bearing bore 69 which lies parallel to the tranasversely extending apex of triangular jaw portion 63, and which is centrally disposed within pawl 66 so as to intercommunicate with the two opposite lateral faces of said pawl 66 which are adjacent to the lateral face which includes jaw portion 63. Pawl 66 is further formed with a cam engaging lever arm portion 67 adjacent its opposite end.

Each of the identical pawls 64 and 66 is journalled within bores 69 upon a pivot axle 39. The diameter of each said pivot axle 39 is slightly less than that of bores 69 and each axle 39 is rigidly secured at its opposite ends, by suitable means, to rear wall 32 and forward wall 38 of frame 30. Both of the axles 39 are positioned within frame 30 so as to lie parallel with each other in a horizontal plane of frame 30 and to extend parallel with the planes of rotation of wheels 23, 27a and 27b, and to support pawls 64 and 66 journalled on said axles 39 in such position that their jaw portions 61 and 63 will lie mutually opposed in a horizontal plane of frame 30 which intersects both channels 46 of rear and forward cradle portions 41 and 42 midway in the depth of said channels 46.

Pawl engaging springs 62 and 68 are compression springs of well known construction which are retained by suitable means in constant engagement with the outwardly directed faces of pawls 64 and 66 respectively and in similar engagement with the inner faces of walls 34 and 36 respectively of frame 30 at points displaced vertically above the axial center of camshaft 25 so as to constantly urge jaws 61 and 63 of pawls 64 and 66 to be actuated toward each other about axles 39.

VIII. Means for holding the dolly secured to the aircraft

I also provide in dolly 20 latch holding means 70 which is shown in FIG. 6 and comprises a cylindrical cam sleeve portion 71 having an internal bore of sufficient diameter that camshaft 25 will be slidable therein and having an outside radius less than the distance from the rotational axis of camshaft 25 to the nearest extremity of lever arms 65 and 67 hereinafter called the minimum cam radius. Sleeve portion 71 is formed integrally with a cam portion 72 having an outside radius greater than said minimum cam radius. Cam portion 72 is formed concentrically with sleeve portion 71 so as to extend arcuately about less than half the circumference of said sleeve portion 71 as shown specifically in FIG. 7. Cam portion 72 is sufficiently wide to prevent convergent motion of oppositely disposed lever arms 65 and 67 (FIG. 9) when portion 72 is interposed between said levers 65 and 67. Sleeve 71 is adapted to be secured by suitable means as for example by a setscrew 73 to camshaft 25 in such position that cam portion 72 will be rotated by camshaft 25 so as to be interposed between lever arms 65 and 67 when legs 24 and 26 are in the extended position relative to leg 28 as shown in FIG. 2.

IX. Means for releasing the dolly from the aircraft

I also provide in dolly 20 latch releasing means 80 shown in FIG. 6 which comprises cams 84 and 86 of similar configuration. Cam 86 is formed with a sleeve portion 89 having an axial bore of sufficient diameter to be slidable upon camshaft 25 and an outside radius less than the minimum cam radius previously described under topic VIII, a cam portion 88 having an outside circumferential radius greater than said minimum cam radius. Cam portion 88 is further formed with an outer plane face 78 perpendicular with the axis of the central bore of sleeve portion 89 and oppositely disposed cam face 93 generally parallel with said outer plane face 78, said cam face 93 being undercut across the entire radial area of cam portion 88 (FIG. 8) and along one half the circumference of portion 88, said undercut being greater in depth than the angular distance through which lever arm 67 travels arcuately in moving from its vertical position of engagement shown in FIG. 9 to its angular pawl releasing position shown in the broken lines of FIG. 9. A tapered cam face 83 interconnects faces 93 and 87 at the opposite ends of said undercut faces 87.

Cam 86 is adapted to be secured by suitable means as for example setscrew 76 to camshaft 25 in such position that sleeve portion 89 may be rotated by camshaft 25 without contacting lever arm 67 until cam 72 is rotated from a position mediate arms 65 and 67 whereupon further rotation of camshaft 25 will cause a tapered face 83 of cam 86 to engage arm 67 and to rotate arm 67 toward arm 65 a sufficient distance that jaw 63 will be actuated by arm 67 to a position outside of recess 56 of keel rail 16.

Cam 84 is of opposite conformation to cam 86, each said cam being disposed along camshaft 25 as shown in FIG. 6 on opposite sides of holding cam 72 with the cam faces of cams 84 and 86 facing toward the opposite sides of cam 72.

X. Means for fixedly adjusting the attitude of the aircraft when secured to the dolly Means 90 is also provided as shown in FIG. 5 for adjustably fixing the attitude of the aircraft about its horizontal axis. Such means 90 comprises a cross beam 95 rigidly secured at its opposite ends to the inner faces of legs 24 and 26 and having a tapped bore 96 centrally positioned therein and in intercommunication with the upper and lower surfaces of said beam 95, a spar 31 rigidly secured at one end to the center of forward wall 38 of frame 30 and projecting forwardly therefrom so as to lie parallel with the common axis of the two channels 46 of cradle means 40, and an adjusting screw 97, threadably engaged within tapped bore 96. In this connection the cams may be adjusted rotationally by loosening the setscrews referred to above.

XI. Means for locking the dolly of the aircraft prevent automatic release

I also provide pushbutton means 100 for at times when desired positively locking dolly 20 to prevent automatic release of dolly 20 from aircraft 15 when the aircraft becomes airborne. Said means 100 shown specifically in FIG. 10 comprises a lock body 101, a locking piston 102, a releasing piston 103, piston springs 104 and 105, detent balls 106 and 107, a ball spacer bar 108, and a lock engaging spar, each of which is specifically described hereafter. One face of lock body 101 is formed of suitable material with two substantially parallel relatively large blind bores 112 and 113, bore 112 being provided with a relatively small axially aligned counterbore 116. Lock body 101 also has a relative small transverse bore 114 providing a housing for spacer bar 108. Lock piston 102 has a major diameter sufficient to allow it to fit snugly within bore 112 and to be freely slidable therein. Piston 102 is further formed on one end with an axially extending lock pin 115 of sufficient diameter to be slidably reciprocated longitudinally in counterbore 116 and of a length greater than the distance which piston 102 is permitted to travel longitudinally with bore 112. Each of pistons 102 and 103 are formed with a push pin such as 119 of suitable length and diameter formed on one end thereof said pins being provided with heads such as 111. Release piston 103 is formed with a major diameter sufficient to permit it to fit snugly into large bore 113 and to be freely reciprocable therein.

Detent balls 106 and 107 are formed of metallic material to a spherical configuration and have a diameter only slightly less than that of transverse bore 114 so as to be freely slidable and rotatable therein.

Pistons 102 and 103 have similar circumferential grooves 122 and 123 formed in their respective outer cylindrical faces and spaced in said faces adjacent to the push pin end of said pistons 102 and 103. Grooves 122 and 123 each have a width of approximately the diameter of the balls 106 and 107 and has a depth not greater than the radius of the balls.

Ball spacer pin 108 is formed of material similar to that of balls 106 and 107 with a cylindrical diameter not greater than the diameter of said balls and is of sufficient length to render the overall confined length of pin 108 and balls 106 and 107 greater than the axial length of passage 114.

Compression springs 104 and 105 bear upon lock body 101 and pistons 102 and 103 to constantly urge the pistons toward the open end of blind bores 112 and 113 respectively. A retainer plate 10 is secured to body 101 by suitable screw means to retain pistons 102 and 103 within their respective bores.

Lock body 101 is rigidly secured as shown specifically in FIG. 4 to a leg such as leg 26 of dolly 20 so that lock pin 115, when extended, will engage a cooperating hole in a spar 33 rigidly secured to wall 36 of frame 30 and extending rearwardly therefrom. When the pin 115 is positioned in said cooperating hole, it prevents rotation of mutually secured legs 24 and 26 about the horizontal axis of frame 30 and about the rotational axis of camshaft 25.

XII. Operation

The aircraft launching dolly 20 is positioned on a takeoff surface and held by suitable means (as for example, by a jack under the central point or by blocking its forward and rear wheels) in a retracted configuration shown in FIG. 3. The fuselage 17 of an aircraft 15 without fixed landing gear is positioned as shown in FIG. 9 on said dolly 20 with the normal axis of the aircraft extending centrally through frame 30 of dolly 20, with the underside of fuselage 17 cradled in concave faces 45 of frame 30 and with keel rail 16 of fuselage 17 disposed longitudinally within channels 46 of frame 30.

Dolly 20 is then permitted to assume the extended configuration of FIG. 2 by permitting legs 24 and 26 to rotate about the axis of camshaft 25 until adjusting screw 97 (FIG. 5) contacts spar 31 of frame 30. Rotation of legs 26 and 24 (FIG. 9) rotates camshaft 25 so as to rotate its upper surface backwardly within frame 30, carrying with it releasing cams 84 and 86 which have been in engagement with arms 65 and 67 respectively and have been holding jaws 61 and 63 in the diverged open position shown in broken lines in FIG. 9.

When cams 84 and 86 are rotated about the axis of camshaft 25 sufficiently so that they no longer engage arms 65 and 67, springs 62 and 68 urge jaws 61 and 63 to the convergent position of FIG. 9 with jaws 61 and 63 oppositely positioned in opposite recesses 54 and 56 of keel rail 16. Cam 72 moves between the lower ends of lever arms 65 and 67 and thus holds and positively locks jaws 61 and 63 in the recesses 54 and 56. Cams 72, 84, and 86 have been adjusted (by loosening screws 75 and 76) and adjusting screw 97 (FIG. 5) has been adjusted to position the aircraft 15 at takeoff at the optimum takeoff attitude of that particular aircraft which is determined by the aerodynamic characteristics of the specific aircraft. Aircraft 15 mounted on dolly 20 (FIG. 1) is then moved to launching position at one end of a runway or other takeoff surface. The longitudinal axis of aircraft 15 is aligned along the desired takeoff path. The engine of aircraft 15 is started, warmed up and checked. The engine controls of the aircraft are then adjusted for takeoff power, either directly or remotely, and aircraft 15 is allowed to proceed under its own power, along the proposed runway or takeoff path.

When the aircraft 15 with dolly 20 attached thereto has attained an airspeed sufficient for the aircraft to become airborne the lift exerted by aircraft 15 will tend to lift the aircraft and the attached frame 30 of dolly 20 from the takeoff surface while the weight of wheels 27a and 27b will tend to keep the attached outwardly extending ends of legs 24 and 26 at the takeoff surface. Thus as the aircraft leaves the surface, legs 24 and 26 will be rotated by their attached wheels 27a and 27b about the horizontal axis of frame 30 which is coincidental with the axis of camshaft 25. When legs 24 and 26 are rotated to the relative position of FIG. 3 with respect to frame 30, holding cam 72 (FIG. 9) is rotated out of its holding position intermediate of lever arms 65 and 67 and releasing cams 84 and 86 are rotated until their respective tapered faces 83 and 87 (FIG. 6) engage arms 65 and 67 forcing them to rotate convergently about their axles 69 and to rotate jaws 61 and 63 divergently so as to free them from engagement with recesses 54 and 56 of keel rail 16 of aircraft 15. This point represents the attitude of the aircraft 15 which has the optimum aerodynamic lift. Thereupon the aircraft is released from the dolly. On release of the aircraft and release of lifting force from the dolly, the dolly settles into the position shown in FIG. 2. Use of suitable braking mechanism actuated by return of the dolly to the original position as shown in FIG. 2 stops the forward movement of the dolly quickly.

Since the launching dolly 20 of my invention is intended to serve also as the undercarriage of an aircraft at rest upon the ground, I provide the locking means 100 (FIGS. 4 and 10) for controllably maintaining rotatable legs 24 and 26 and frame 30 in constant interlocked relationship when desired when dolly 20 is in the extended configuration of FIG. 2 on the ground.

In the locking device shown in detail in FIG. 10 locking piston 102 is maintained in the locked position (shown in FIG. 4 with lock bolt 115 extended) by ball 107 in engagement with circumferential channel 122 of piston 102.

To release said lock, release piston 103 is depressed (by means of push button 111) against the pressure of spring 105, until channel 123 of piston 103 is in register with passage 114. Spring 104 urges piston 102 toward the opposite end of bore 112 and piston 102 urges ball 106 toward passage 114. When channel 123 is in register with passage 114, ball 107 is urged to project into channel 123 by pin 108 and ball 106 under pressure from piston 102. Ball 106 is then permitted to enter passage 114 to free bore 112 and allow piston 102 to be urged to the opposite position therein by spring 104 so as to retract lock bolt 115. The procedure is reversed to reset the lock bolt 115 into the extended locked position of FIG. 10.

Lock 100 is rigidly attached to leg 26 as seen in FIG. 4 and bolt 115 engages spar 33 of frame 30 to prevent relative rotation of leg 22 (secured to frame 30) and legs 24 and 26 about the axis of camshaft 25 when lock 100 is in the locked position of FIG. 4.

It is to be understood that the above described embodiments of my invention are for the purpose of illustration only and various changes may be made therein without departing from the spirit and scope of my invention.

I claim:

1. A launching apparatus for an aircraft comprising a cradle, for engaging the fuselage of an aircraft; a plurality of legs each attached at one end to said cradle; a wheel rotatably attached to the outwardly extending end of each such leg; latching means comprising a plurality of oppositely disposed pawls pivotally secured within said cradle for engaging a frame member of an attached aircraft between cooperating jaws, each such pawl being formed with a cam engaging lever arm; a camshaft journalled in opposite sides of said cradle and secured at its opposite ends to at least one of said legs; and holding means comprising a holding cam secured to said camshaft for maintaining said lever arms in positions of mutual separation and maintaining said jaws in secure mutual engagement with said aircraft frame member so long as said aircraft is not airborne.

2. A launching apparatus for an aircraft comprising a cradle for engaging the fuselage of an aircraft; a plurality of legs each attached at one end to said cradle; a wheel rotatably attached to the opposite end of each such leg; a plurality of oppositely disposed pawls pivotally secured within said cradle and at times engaging a frame member of an attached aircraft between cooperating jaws of said pawls, each such pawl being formed with a cam engaging lever arm; a plurality of latch springs, each of which bears upon a wall of said cradle and upon the jaw portion of one of said pawls for maintaining said cooperating jaws in mutual engagement with said aircraft frame member; a cam shaft journalled in opposite walls of said cradle and secured at its opposite ends to two of said legs; and a plurality of releasing cams secured to said camshaft each of which at times engages said oppositely disposed lever arms, urges them together and separates said cooperating jaws for releasing said aircraft from the launching apparatus when the aircraft becomes airborne.

3. A launching apparatus for an aircraft comprising a cradle for engaging the fuselage of an aircraft, a plurality of legs extending radially from a horizontal axis, each of which is attached at one end to said cradle; a wheel rotatably attached to the opposite end of each such leg; means for securing said apparatus to an aircraft not airborne; and means for releasing said apparatus from an aircraft when it becomes airborne; in which there is provided a cam shaft which extends through and is journalled within said cradle, and has an axle common to said horizontal axis, in which at least one of said radially extending legs is secured to said camshaft, and in which the remainder of said legs are rigidly secured to said cradle.

4. A launching apparatus for an aircraft comprising a cradle for engaging the fuselage of an aircraft, a plurality of legs extending radially from a horizontal axis, each of which is attached at one end to said cradle; a wheel rotatably attached to the opposite end of each such leg; means for securing said apparatus to an aircraft not airborne; and means for releasing said apparatus from an aircraft when it becomes airborne; in which the means for securing said apparatus to an aircraft comprises a plurality of oppositely disposed pawls pivotally secured within said cradle for engaging a frame member of such aircraft, each such pawl having a lever arm extending beyond its pivot point; a plurality of pawl springs each bearing upon a wall of said cradle and upon one of said pawls to urge said pawl to rotate about its pivot toward an oppositely disposed pawl; and means for releasing said apparatus comprising a plurality of cams secured to a camshaft disposed along said horizontal axis for urging said lever arms to rotate toward each other and for rotating the cooperating jaws of said pawls away from each other to release the aircraft secured thereby, when said legs secured to said camshaft are rotated downwardly about said horizontal axis.

5. In an aircraft launching apparatus, an aircraft engaging device comprising a cradle frame; latching means which comprises a plurality of oppositely disposed pawls pivotally secured within said cradle frame for engaging a frame member of an aircraft, each such pawl being formed for pivoting about a centrally disposed transverse axis, having one end formed into a laterally disposed jaw portion, and having its opposite end portion formed into a cam-engaging lever arm; a pawl actuating means which comprises a camshaft journalled within said cradle frame and rotatable about a horizontal axis of said frame disposed at right angles to the parallel pivotal axes of said pawls, said camshaft being secured to a plurality of weighted levers and at times rotatable thereby; a latch holding means which comprises a cam secured to said camshaft in such position that said cam is interposed between the mutually adjacent inner faces of the cam engaging arms of said oppositely disposed dogs when said weighted lever arms approach and are in their lowermost position of limited rotation about the axis of said camshaft; and a latch releasing means comprising a plurality of cams secured to said camshaft and disposed thereon in such position that said cams engage the outer faces of said cam engaging arms when said weighted lever arms approach and are in the uppermost position of their limited rotation.

6. Latching means comprising a frame, a plurality of oppositely disposed pawls pivotally secured within said frame, each such pawl being formed for pivoting about an axis, having one end formed into a laterally disposed jaw portion, and having its opposite end portion formed into a cam-engaging lever arm; a pawl actuating means which comprises a camshaft journalled within said frame and rotatable about an axis of said frame disposed at right angles to the parallel pivotal axes of said pawls, said camshaft being rotatable; a latch holding means which comprises a cam secured to said camshaft in such position that said cam is at times interposed between the mutually adjacent inner faces of the cam engaging arms of said oppositely disposed dogs; and a latch releasing means comprising a plurality of cams secured to said camshaft and disposed thereon in such position that said cams at times engage the outer faces of said cam engaging arms.

References Cited in the file of this patent

UNITED STATES PATENTS

| | | |
|---|---|---|
| 1,347,799 | Wilkins | July 27, 1920 |
| 1,720,492 | Pollock | July 9, 1929 |
| 2,135,033 | Courtney | Nov. 1, 1938 |
| 2,604,279 | Gerin | July 22, 1952 |
| 2,647,776 | Wallis | Aug. 4, 1953 |